United States Patent [19]

Knoll et al.

[11] Patent Number: 4,980,680
[45] Date of Patent: Dec. 25, 1990

[54] CODED SURFACE ACOUSTICAL WAVE (SAW) MOTOR VEHICLE SECURITY DEVICE

[75] Inventors: William C. Knoll, Turbotville, Pa.; James R. McColl, Concord, Mass.

[73] Assignee: GTE Products Corp. and GTE Laboratories, Inc., Danver, Mass.

[21] Appl. No.: 483,349

[22] Filed: Feb. 20, 1990

Related U.S. Application Data

[63] Continuation of Ser. No. 227,282, Aug. 2, 1988, abandoned.

[51] Int. Cl.$^5$ .................... E05B 49/00; B60R 25/00; G01S 9/56
[52] U.S. Cl. .................. 340/825.310; 307/10.5; 307/10.3; 340/825.34; 310/313 R
[58] Field of Search .......... 340/825.3, 825.31, 825.34, 340/825.69, 825.72; 361/172; 70/277, 278; 367/197–199; 180/167, 287, 289; 307/10.1–10.6; 341/176; 310/313 R, 313 B, 314, 321; 333/194, 193; 342/44, 50, 51

[56] References Cited

U.S. PATENT DOCUMENTS

| | | |
|---|---|---|
| 3,706,094 | 12/1972 | Cole et al. |
| 4,096,477 | 6/1978 | Epstein et al. ............ 310/313 R |
| 4,298,792 | 11/1981 | Granholm ............ 307/10.5 |
| 4,327,353 | 4/1982 | Beard et al. ............ 180/287 |
| 4,620,191 | 10/1986 | Skeie ............ 342/51 |
| 4,625,207 | 11/1986 | Skeie ............ 342/51 |
| 4,625,208 | 11/1986 | Skeie et al. ............ 342/51 |
| 4,658,252 | 4/1987 | Rowe ............ 340/825.31 |
| 4,683,462 | 7/1987 | Takeda et al. ............ 340/825.32 |
| 4,737,789 | 4/1988 | Nysen ............ 342/51 |
| 4,737,790 | 4/1988 | Skeie et al. ............ 342/51 |
| 4,738,334 | 4/1988 | Weishaupt ............ 180/287 |
| 4,746,830 | 5/1988 | Holland ............ 310/313 R |
| 4,809,199 | 2/1989 | Burgess et al. ............ 340/825.31 |

FOREIGN PATENT DOCUMENTS

| | | | |
|---|---|---|---|
| 0224607 | 6/1987 | European Pat. Off. ............ 70/278 |
| 0147317 | 7/1987 | Japan ............ 310/313 R |
| 2158870 | 5/1984 | United Kingdom ............ 70/278 |
| 8700234 | 1/1987 | World Int. Prop. O. ............ 70/278 |
| 8704482 | 7/1987 | World Int. Prop. O. ............ 70/278 |

Primary Examiner—Donald J. Yusko
Assistant Examiner—Eric O. Pudpud
Attorney, Agent, or Firm—Salzman & Levy

[57] ABSTRACT

A theft resistant security system for motor vehicles. The system has a receptacle with a coupling coil. A surface acoustical wave device associated with the receptacle for relative movement thereto is also provided. The SAW device has a code and its own coupling coil for interaction with the receptacle coupling coil. A testing mechanism is connected to the receptacle for determining whether the code of the SAW device is valid for operation of the motor vehicle.

11 Claims, 7 Drawing Sheets

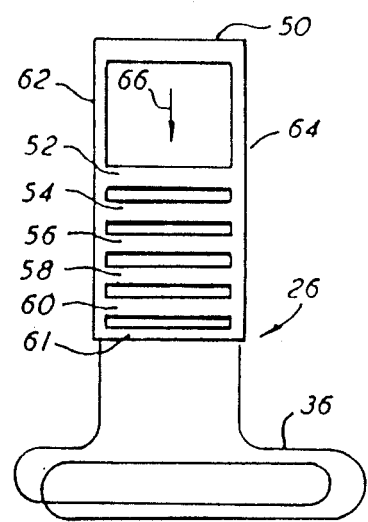
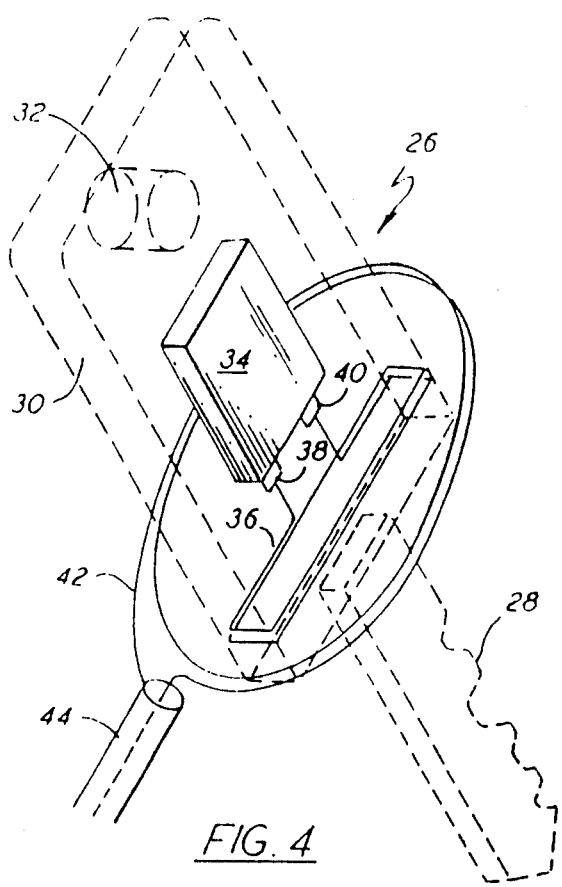
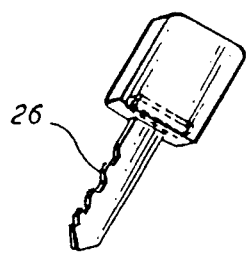
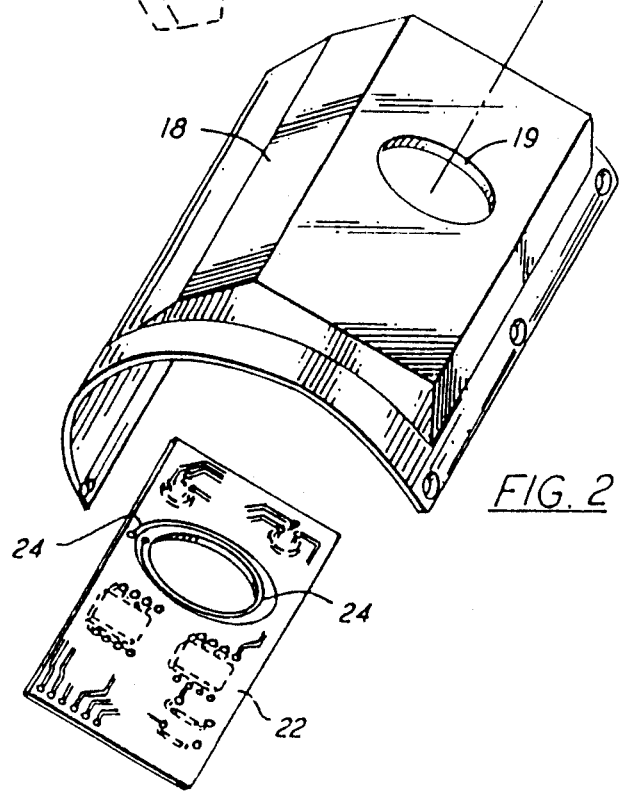

CODED SURFACE ACOUSTICAL WAVE (SAW) MOTOR VEHICLE SECURITY DEVICE

This is a continuation of copending application Ser. No. 07/227,282, filed on Aug. 2, 1988 and now abandoned.

CROSS REFERENCE TO RELATED APPLICATIONS

The present application is related in subject matter to U.S. Pat. No. 4,931,664 for "Controller for Coded Surface Acoustical Wave (SAW) Security System", filed concurrently herewith.

BACKGROUND OF THE INVENTION

The present invention relates to a security device for a motor vehicle and, more particularly, to a coded surface acoustical wave (SAW) device that interacts with the ignition system of a motor vehicle.

Motor vehicles are susceptible to theft due to their relative high value and inherent transportability. Automobiles and trucks are especially attractive as objects of theft, as evidenced by an alarmingly high theft rate in many civilized countries.

The simplest security device has been the ignition key, which is relatively unique for each automobile corresponding thereto. However, professional thieves now duplicate such mechanical keys, by-pass ignition switches and/or remove the ignition apparatus from automobiles altogether in order to jump start them.

Heretofore, most systems for preventing theft of automobiles have been relegated to audible alarms signaling the attempted theft or break-in of the protected automobile. Certain mechanical and/or electronic interlocking devices have made it difficult for an automobile to be stolen by means of a standard ignition key alone. One such mechanical device comprises a tumbler lock and bar adapted to retain a steering wheel in a fixed position. The use of that system is, of course, cumbersome as well as time consuming.

Another interlocking device is a mechanical ignition key that contains resistive elements. Unfortunately, that system requires direct physical and electrical contact between the key and the electric sensor, which contact cannot always be guaranteed.

Recently, surface acoustic or acoustical wave (SAW) devices have been used to label certain items, such as objects for sale in retail establishments and individual inventory parts in warehouses. A SAW label system generally includes an interrogator for transmitting a first radio frequency (RF) signal and a SAW transponder which receives the signal, processes it and sends back a second RF signal containing encoded information. A receiver receives the second signal and decodes the information.

The transponder is nonpowered or passive. It receives the first (interrogating) signal as an input and produces the second (reply) signal as an output. Passive signal transforming means, within the transponder, converts the first signal to the second signal.

The transforming means includes signal conditioning elements coupled to receive the first signal from a transponder antenna. Each signal conditioning element provides an intermediate signal having a known delay and a known amplitude modification to the first signal. The transforming means also includes a signal combining element coupled to all of the signal conditioning elements for combining intermediate signals by addition or by multiplication to produce the second signal. The signal conditioning elements and the signal combining element impart a known informational code to the second signal which identifies the particular transponder. The second signal can be coupled out of the same antenna or a separate antenna for transmission as a reply.

Radiation, picked up by the antenna, is converted into electrical signals which are, in turn, converted into surface acoustic waves on the SAW device by a so-called leading transducer. These waves travel outwardly in opposite directions from opposite sides of the leading transducer and are then reconverted into electrical signals.

The aforementioned system is described in greater detail in U.S. Pat. No. 4,737,790 issued to Skeie et al. The system disclosed therein uses a voltage controlled oscillator to produce the first signal.

U.S. Pat. No. 4,625,208 issued to Skeie et al discloses a passive transponder for use in an interrogation system. A circuit is connected to transducer elements for supplying interrogating signals to the transducer elements and for receiving reply signals therefrom. Acoustic wave reflectors are provided to reflect the surface acoustic waves back towards the transducer elements.

As mentioned above, the systems disclosed in the aforementioned patents include a transmitter capable of transmitting RF pulses of electromagnetic energy. These pulses are received at the antenna of the transponder and applied to a piezoelectric leading transducer adapted to convert the electrical energy received from the antenna into acoustic wave energy in the piezoelectric material. Upon receipt of a pulse, an acoustic wave is generated within the piezoelectric material and is transmitted along a defined acoustic path.

Further transducers arranged at prescribed spaced intervals along this acoustic path convert the acoustic wave back into electrical energy thereby re-exciting the antenna of the transponder. The presence or absence of transducers at the prescribed locations along the acoustic wave path determines whether a reply pulse will be transmitted with a particular time delay in response to an interrogation pulse. This determines the informational code contained in the transponder reply.

When an acoustic wave pulse is reconverted into an electrical signal, it is supplied to an antenna on a transponder and transmitted as RF electromagnetic energy. This energy is received at a receiver and decoder, preferably at the same location as the interrogating transmitter, and the information contained in the response is decoded.

If SAW technology could be used for purposes other than mere identification of items, a significant improvement in security of valuable objects such as motor vehicles could be achieved.

A sophisticated security device is required for helping to ensure that an automobile may not be started and driven by one not authorized to do so.

It would be advantageous to provide a motor vehicle security system that would make it impossible to start the vehicle by using an unauthorized ignition key, or by by-passing the ignition switch or even by removing the switch assembly.

It would also be advantageous to provide a security system which does not require an electrical source of supply such as an electric battery.

It would also be advantageous to provide a security system which does not require electrical contact.

It would be advantageous to provide a SAW-based security system for discouraging theft of motor vehicles.

It would further be advantageous to provide a SAW-based security interlock system in the form of an ignition key.

SUMMARY OF THE INVENTION

In accordance with the present invention, there is provided a theft resistant system for motor vehicles. The system has a receptacle with a coupling coil. A SAW device associated with the receptacle for relative movement thereto is also provided. The SAW device has a code and its own coupling coil for interaction with the receptacle coupling coil for self-propagation of an acoustical wave. A testing mechanism is connected to the receptacle for determining whether the code of the SAW device is valid for operation of the motor vehicle.

BRIEF DESCRIPTION OF THE DRAWINGS

A complete understanding of the present invention may be obtained by reference to the accompanying drawings, when taken in conjunction with the detailed description thereof and in which:

FIG. 2 is an exploded perspective assembly view of the preferred embodiment of the present invention;

FIG. 4 is a schematic representation of a key with a SAW device inserted in proximity to a coupling coil;

FIG. 6 is a representation of a SAW device shown connected to a coupling coil;

DESCRIPTION OF THE PREFERRED EMBODIMENT

Figure 1:
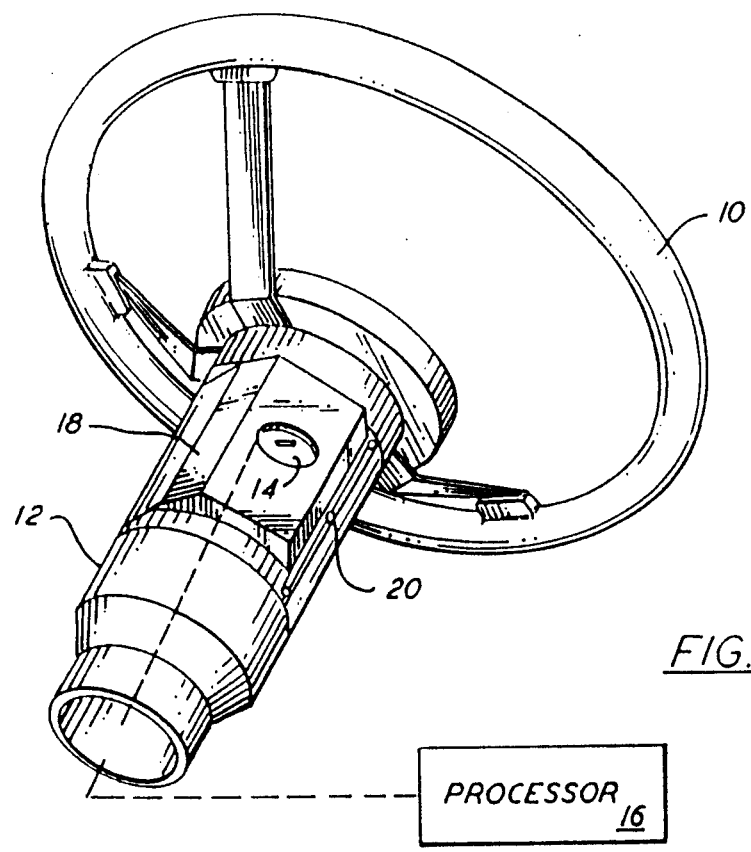
FIG. 1 is a perspective view of a steering column, steering wheel and computer processor.

Referring now to FIG. 1, there are shown a conventional steering wheel 10 and steering column 12, as can be found in most motor vehicles and especially in automobiles. Connected to an ignition switch 14, hereinbelow described in greater detail, is a microprocessor 16. Many motor vehicles have electronic brains or computer processors such as that shown as reference numeral 16, used to regulate the electrical, mechanical and chemical systems used in the vehicles. Often, general purpose computers, a network thereof, or microprocessor-based electronic systems are used for the various functions. For example, a computer processor in an automobile may be used to regulate gas flow, to signal malfunctions in brake systems, to indicate the level of oil in the crankcase, to adjust internal temperature and the like.

A collar housing 18 is shown mounted on the steering column 12 by means of screws 20, although any suitable mounting means may be used for this purpose. The collar 18 houses a coupling coil or antenna, not shown, the use of which is explained hereafter. Certain circuitry may also be contained within the collar 18.

Referring now also to FIG. 2, there is shown a perspective assembly view of the preferred embodiment of the present invention. The collar housing 18 has a circular aperture 19 cut therein. A printed circuit board or card 22 is housed by the collar housing 18 and encircles the ignition switch, not shown. The printed circuit board 22 has components mounted thereon that function as a receiver in cooperation with a SAW device as hereinbelow described. Encircling the printed circuit board aperture is a coupling coil 24, the use of which is described in greater detail hereinbelow.

An ignition key is shown generally at reference numeral 26. The key 26 is adapted to be inserted through the collar aperture 19 and into the ignition switch, not shown. It should be noted that a conventional ignition key with a coded mechanical blade is not necessarily a requirement of the present invention.

Figures 3, 5:
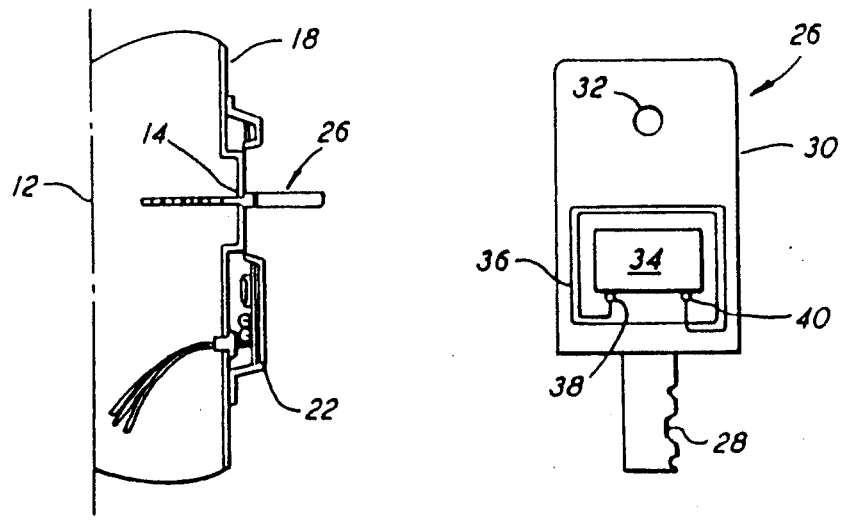
FIG. 3 is a cross sectional view of a key inserted in an ignition switch.
FIG. 5 is a schematic representation of a key with a SAW device imbedded therein.

Referring now also to FIG. 3, there is shown a cross sectional side view of an ignition key 26 inserted into the ignition switch 14.

Referring now also to FIG. 4, there is shown a schematic representation of an ignition key 26, the outline of which is shown in phantom. In the preferred embodiment, the key 26 has a longitudinal mechanical protuberance 28, as do most conventional ignition keys. This longitudinal section 28 is preferably fabricated of metal and is mechanically coded to fit a particular ignition key lock, not shown.

Connected to the metal protuberance 28 is a key handle 30. The handle 30 has an aperture 32 adapted to fit onto conventional key holders and key rings, not shown. The handle 30 can be rubber, plastic or any other suitable nonmetallic material. Plastic is preferred. Imbedded in the handle 30 is a surface acoustical wave (SAW) device 34. Connected to the SAW device 34 is a coupling coil or antenna 36. The coil 36 forms a continuous loop connected to the SAW device 34 at ports 38 and 40 and is disposed perpendicular to the major axis of the key 26 and the SAW device 34.

Also shown in FIG. 4 is a second coupling coil or antenna 42, which encircles the SAW device coil 36, but is not connected thereto. The second coil 42 is connected to a sensor, not shown, by means of an electrically conductive cable 44. It can be seen that the key 26 and SAW device coil 36 are adapted to move relative to the second coil 42.

Referring now also to FIG. 5, there is shown another cross sectional view of an ignition key in accordance with the present invention. In this embodiment, the SAW device coil 36 is disposed parallel to the major plane of the key 26 and of the SAW device 34. This coil configuration can also be used with appropriate modification to the sensor coil 42 (FIG. 4).

Referring now also to FIG. 6, there is shown a representation of a SAW transponder, which is imbedded in an ignition key 26 and to which is connected a coupling coil 36. It should be noted that other coil or antenna configurations, such as dipole antennas, can also be used.

The transponder operates to convert a received signal to an acoustic wave and then to reconvert the acoustic energy back into an electrical signal for transmission via the coupling coil 36. Tee signal transforming element of the transponder includes a substrate of piezoelectric material, not shown, on one surface of which is deposited a layer of metal, such as aluminum, forming a 6-bit spatial pattern of electrodes or transducers shown in FIG. 6. In alternate embodiments, binary codes of more or less than six bits can be used. Moreover, the code itself need not necessarily be binary.

The piezoelectric substrate, not shown, is fabricated from YZ lithium niobate (LiNbO$_3$). Other materials can be used for the piezoelectric substrate, such as PZT ceramic and PVDF polymers.

The aforementioned transducer pattern comprises two bus bars 62 and 64 connected to the coupling coil 36. A leading transducer 50 and a plurality of coding elements or tap transducers 52, 54, 56, 58, 60, 61 are also provided. These transducers are also known as interdigitated electrode arrays. The bus bars 62 and 64 define a path of travel, shown by arrow 66, for an acoustic wave which is generated by the leading transducer 50 and propagates substantially linearly, reaching the tap transducers 52-61 each in turn. The tap transducers 52-61 convert the acoustic wave back into electrical energy which is collected and therefore summed by the bus bars 62 and 64. This electrical energy then activates the coupling coil 36 and is converted into electromagnetic radiation for transmission.

In the preferred embodiment, the tap transducers 52-61 are provided at equally spaced intervals along the acoustic wave path 66. An informational code associated with the transponder can be imparted by removing a selected number of tap transducers 52-61. In alternate embodiments, delay pads, not shown, can be provided between tap transducers 52-61 They can be made of the same material as, and deposited with, the bus bars 62 and 64 and the tap transducers 52-61, each delay pad having a width sufficient to delay the propagation of the acoustic wave from one tap transducer 52, for example, to the next 54.

The use of irregularly shaped delay pads, not shown, would make it possible to control the amplitude as well as the phase of the acoustic wave. Such amplitude modification may be detected by a receiver or sensor and decoder system so that additional codes may be imparted in the transponder without requiring additional tap transducers and delay pads.

Figure 7:
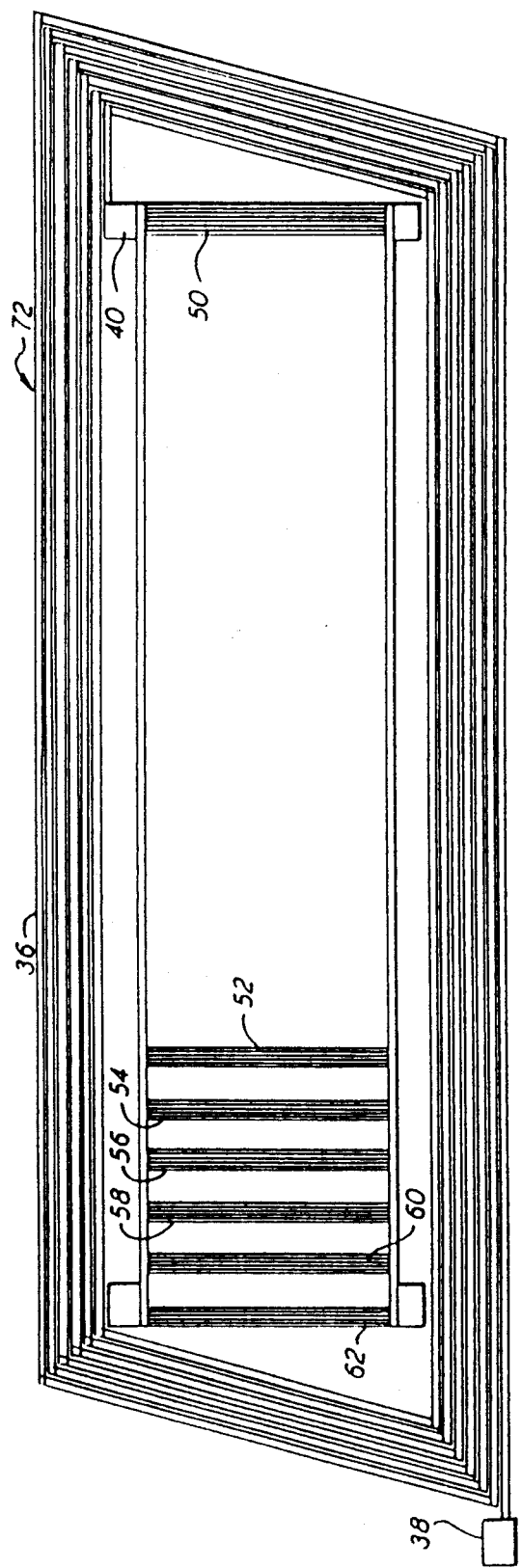
FIG. 7 is an exploded plan view of a SAW device.

Referring now also to FIG. 7, an exploded view of the transponder of FIG. 6 is shown with leading transducer 50 and the set of tap transducers 52, 54, 56, 58, 60, 61 consisting of a total of 200 electrodes. At least two versions are available on the photomask: a single electrode and a double (or split) electrode. The split electrode version of the preferred embodiment has 400 electrodes spaced at quarter wavelengths, resulting in 40 interdigitated electrodes per transducer. The latter configuration provides freedom to vary bit rate and bit size. SAW devices can be fabricated and customized by using conventional photolithography means well known in the art.

Alternate electrodes are connected to different conductors by means of the bus bars 62 and 64 The spacing of the electrodes is approximately 38.68 $\mu$m. The precise distance is adjusted to be one half of a wavelength of a surface electroacoustic wave at the operating center frequency of 44.33 MHz. The bit size is 10 cycles per bit, resulting in a bit rate of 4.433 MHz. Modulation is by amplitude (AM), pulse presence. The desired code is carried by the array by means of connecting or disconnecting an array element 52-61 at a given point on the bus bars 62 and 64, signifying respectively a one or a zero binary digit.

In practice, all keys are manufactured with a full sequence of ones by having all array elements present. The required code is impressed on the key by severing the connection of an appropriate number of array elements from the bus bars 62 and 64. One process for severing the interdigitated electrodes is by means of standard photolithographic processing known in the art.

It should also be understood that, although pulse presence in coding is preferred, the system described can likewise be operated with pulse width modulation or pulse position modulation. The latter two alternatives, however, require more bits for the same number of codes. Handling more bits on the same chip requires more transducer fingers and fewer cycles per bit. This tends to reduce signal level and can increase spurious levels.

In the preferred embodiment, the modulation scheme uses six bits, with three and only three bits always being present. A parity check can therefore be performed to ensure that three bits are set. With 20 half-cycles per bit and an active SAW area restricted to a length of 8 mm, there is room on the chip for nine bits. The restriction to 8 mm is completely arbitrary, but some limitation has to be made for practicality and economy. The aforementioned 6-bit code is implemented in the last six of the nine bits; the first three bits are always set to $\emptyset$ to reduce crosstalk.

Twenty codes are possible in the 3/6 modulation scheme. They are assigned values arbitrarily as shown in Table I.

TABLE I

| Six-Bit Codes | |
|---|---|
| Index | Code |
| 1 | 111000 |
| 2 | 110100 |
| 3 | 110010 |
| 4 | 110001 |
| 5 | 101100 |
| 6 | 101010 |
| 7 | 101001 |
| 8 | 100110 |
| 9 | 100101 |
| 10 | 100011 |
| 11 | 011100 |
| 12 | 011010 |
| 13 | 011001 |
| 14 | 010110 |
| 15 | 010101 |
| 16 | 010011 |
| 17 | 001110 |
| 18 | 001101 |
| 19 | 001011 |
| 20 | 000111 |

Figure 8:
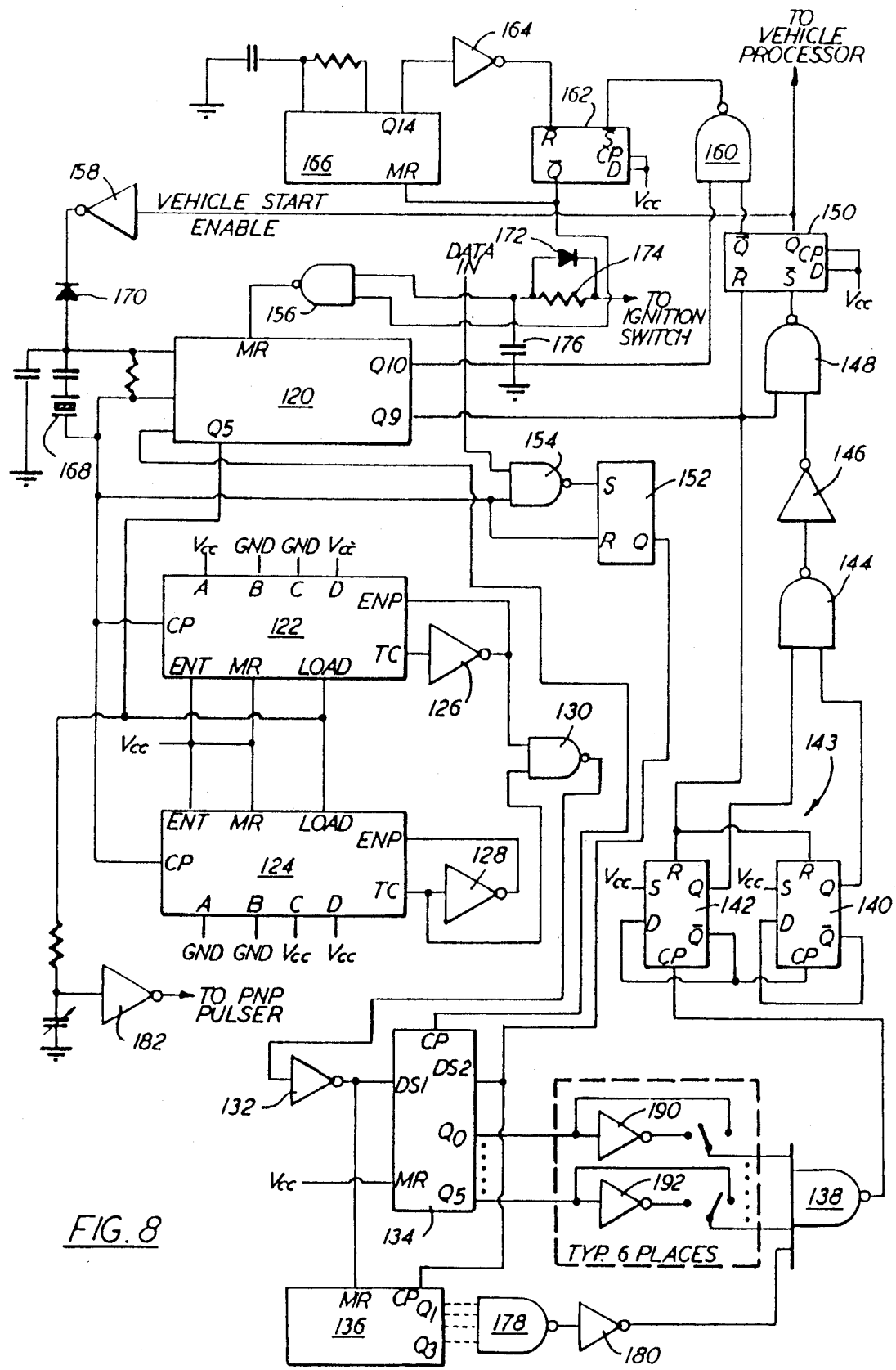
FIG. 8 is a schematic circuit diagram of digital logic used in the present invention.

Referring now also to FIG. 8, logic circuitry is shown. A CMOS integrated circuit (IC) 120, available from RCA Corporation as Model NO. 4060, comprises an oscillator and a multistage divider. Connected to the IC 120 is a crystal 168 for providing a fixed frequency. In the preferred embodiment, the base frequency of the system is 44.33 MHz. The IC 120 has a number of output ports, three of which (Q5, Q9 and Q10) are described in greater detail hereinbelow.

Two integrated circuit chips 122 and 124 are used as a counter and are connected to IC 120. Also connected to IC 120 are two flip flops 150 and 162. NAND gates 148 and 160 are disposed intermediate the IC 120 and the flip flops 150 and 162, respectively.

Another NAND gate 154 receives inputs from a flip flop 152 and data generated by circuitry on the circuit board (FIG. 2) which functions as a receiver. Connected to flip flop 152 is a shift register 134 capable of strobing at least six ports (Q0–Q5) in parallel to respective inverters 190, 192 et al.

Also connected to the register 134 is another integrated circuit device 136 which is capable of counting bits. The output from the bit counter 136 is applied to NAND gate 178 and to inverter 180. Subsequently, the signal inverted by inverter 180 is NANDed with the six bit signals from inverters 190, 192 et al by NAND gate 138. NAND gate 138 is connected to a pair of flip flops 140 and 142 which, in turn, are connected to NAND gate 144, inverter 146, NAND gate 148 and flip flop 150.

The counter 122 and 124 is connected to inverters 126 and 128. The outputs from these inverters 126 and 128 are applied to a NAND gate 130 which, in turn, is applied to inverter 132. The output of inverter 132 is applied to register 134.

An inverter 182 is connected to the counter 122 and 124 and the output thereof is applied to a pulser, as described in further detail with regard to FIG. 9, below.

In operation, the crystal 168 connected to the oscillator 120 forms a system clock, the frequency of which is the same as the data rate of the SAW device. The dividers of the IC 120 provide other system timing. Diode 172, resistor 174 and capacitor 176 perform an initialization function through gate 156, to ensure that the outputs Q5, Q9 and Q10 of IC 120 all start at logic low.

The divide by 512 output Q9 of divider 120 starts low and is applied to the reset R ports of ICs 140, 142, and 150, holding them in a reset mode. This function disables the system for the first half of the divide by 512 cycle, allowing time for the bias in the analog circuits (FIG. 9, below) to reach equilibrium. During the second half of the divide by 512 cycle, the system operates as described below.

The divide by 32 output Q5 of divider 120 cycles eight times during a divide by 512 half cycle. Each high state constitutes a read cycle. The Q5 signal is inverted by device 182 and fed to a pulse circuit, not shown, which excites the key 26 (FIG. 4) at the start of the read cycle. The output of port Q5 of divider 120 is applied to LOAD ports of counter ICs 122 and 124. The low state of the Q5 signal thus preloads the counter 122 and 124.

When the Q5 signal is high, the counter 122 and 124 runs to terminal count and latches via devices 126 and 128. These two signals generated by devices 126 and 128 are gated together in device 130 and inverted by inverter 132 to generate a "read window" which is high only when a binary code is being transferred from the SAW device. This read window is used to enable the shift register 134, so that the register 134 loads data serially only at the proper time.

The data that loads into register 134 is generated by a synchronous detector comprising flip flop 152 and NAND gate 154. The NAND gate 154 has applied thereto data from the receiver (FIG. 2). Since the system clock has the same rate as does the SAW device, they can be gated together in device 154 and shaped by flip flop 152. This minimizes ambiguity in converting an analog coded signal to digital logic levels.

The data that loads into register 134 is also applied to counter 136. This counter 136 and gate 178 form a bit counter, which counts the number of logic high bits, providing an error check function.

The parallel output of register 134 from ports Q0–Q5 is inverted or not inverted, depending upon the code in the data. This mechanism facilitates programming the system for different codes. The parallel output Q0–Q5 is gated, along with the output of bit counter 136, in the 8-input NAND gate 138. If the code matches the program and contains the correct number of high bits, the output of gate 138 goes low, signifying a correct read and successful match.

Flip flops 140 and 142 form a 2-bit counter, shown generally at reference numeral 143. The output of the counter 143 is gated in device 144 so that the gate output goes low for a count of 3. This counter 143 is driven by the correct read signal so the output of gate 144 indicates that three correct reads have been performed.

The output of gate 144 is inverted in inverter 146 and gated with the Q9 signal of divider 120 in NAND gate 148. When the system is enabled and three correct reads have occurred, the output of device 148 goes low, which sets flip flop 150, causing its Q output to go high, generating a VEHICLE START ENABLE signal, allowing the operation of the vehicle, not shown. This high VEHICLE START ENABLE signal is also inverted by inverter 158. Diode 170 clamps the clock oscillator in IC 120, causing the system to be dormant until initialized again.

If three correct reads do not occur, then the $\overline{Q}$ output of IC 150 will be high. At the end of the enable cycle, the Q10 signal of IC 120 goes high. These two signals are gated in NAND gate 160 and flip flop 162 is set. The $\overline{Q}$ output of flip flop 162 then goes high, enabling IC 166 and, via NAND gate 156, disabling IC 120, which disables the system. IC 166 is also an oscillator-divider, which is used as a time delay for up to several minutes, during which time the system is disabled. This delay represents a nuisance factor for would-be car thieves and can be adjusted for any reasonable length of time or for no delay.

Figure 9:
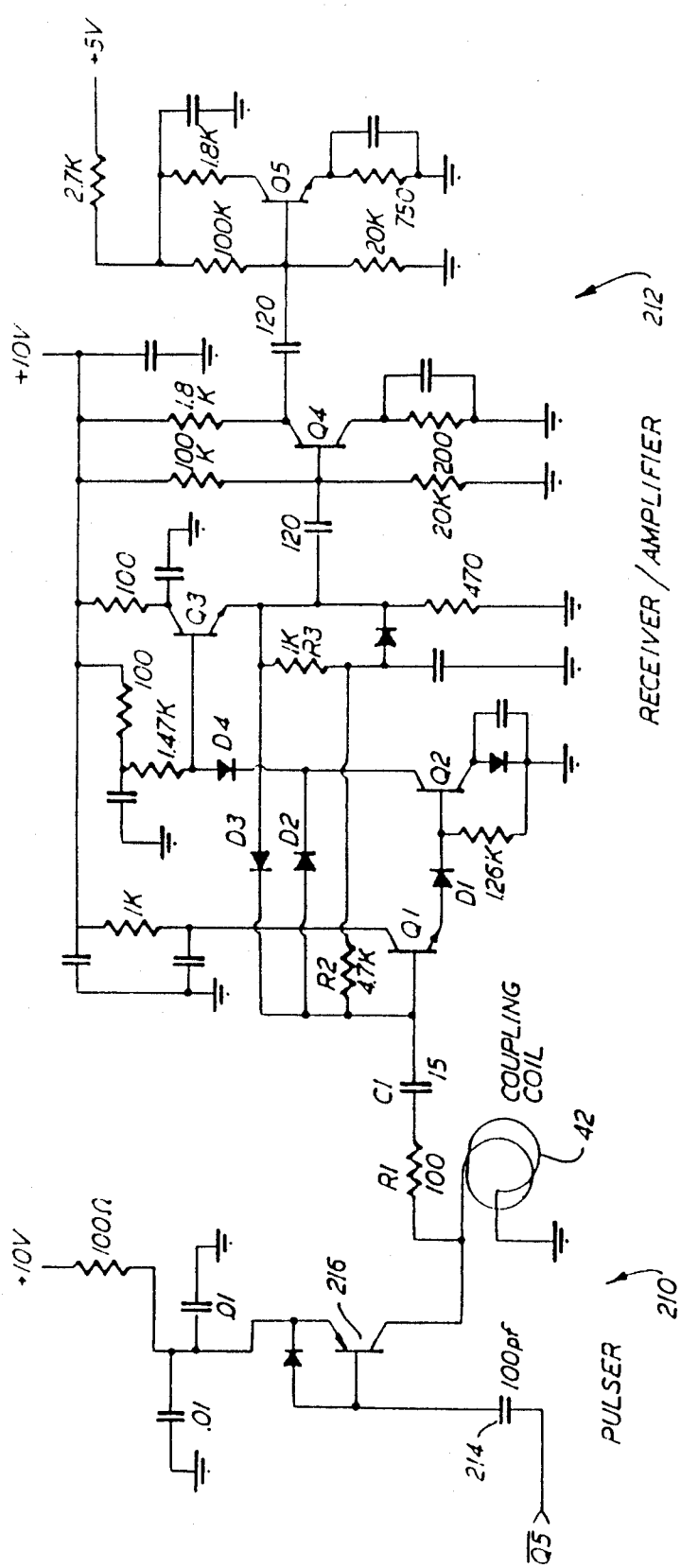
FIG. 9 is a schematic diagram of an analog circuit used to generate a pulse and to provide receiving and amplifying functions.

Referring now also to FIG. 9, there is shown analog circuitry comprising a pulser circuit, shown generally at reference numeral 210, and receiver/amplifier circuitry, circuit 210 provides excitation for the SAW device 34 (FIG. 4). The excitation is in the form of a single cycle, relatively short pulse of approximately 10 volts in the preferred embodiment.

The $\overline{Q5}$ signal generated by the digital circuitry shown in FIG. 8 above is applied to the pulser circuit 210, as shown. In particular, the $\overline{Q5}$ is applied to a 100 of capacitor 214, which is connected to a PNP transistor 216. Also applied to the transistor 216 is a 10 volt power supply.

A coupling coil 42 is connected to the transistor 216 and to ground. The coupling coil 42 of the receiver/amplifier circuit 212 is shown in the mechanical drawing of FIG. 4. This coupling coil 42 is adapted both to transmit a 10 volt pulse and to receive a much weaker response signal thereto from the SAW device shortly thereafter. That is, although the coupling coil 42 is driven with a 10 volt pulse, the same coupling coil then functions as an antenna to receive a signal that is only on the order of a few millivolts, which response signal occurs on the order of a few hundred nanoseconds after the excitation pulse. This millivolt response signal must be amplified by the amplifier circuit 212.

A clamping and resistor isolation mechanism is provided in the amplifier 212 to eliminate or screen the 10 volt pulse and to amplify the smaller response signal. A 100 ohm resistor R1 is connected to the coupling coil 42. Connected to the other terminal of resistor R1 is a capacitor C1. And connected to the other terminal of capacitor C1 is an emitter follower transistor Q1 coupled to a common emitter amplifier transistor Q2 through a diode D1.

Transistors Q4 and Q5 are standard common emitter amplifier stages connected to one another in a suitable manner to amplify the signal to a level sufficiently high to drive the digital logic circuitry shown in FIG. 8.

In operation, when signal $\overline{Q5}$ goes low, it is differentiated by capacitor 214 to drive PNP transistor 216. Transistor 216 drives the coupling coil 42 with a single 10 volt pulse at the beginning of each read cycle.

As mentioned hereinabove, resistor R1 provides isolation for the 10 volt pulse. Capacitor C1 provides AC coupling and DC blocking. Emitter follower transistor Q1 drives common emitter amplifier transistor Q2 through diode D1. The voltage drop in diode D4 allows the emitter voltage of transistor Q3 to be the same level as that of the collector of transistor Q2. With decoupled DC feedback through resistors R2 and R3, the voltage at the base of transistor Q1, collector of transistor Q2 and emitter of transistor Q3 is the same. This allows the use of feedback diodes D2 and D3 for clamping. Transistor Q2 provides "pull down" drive and transistor Q3 provides "pull up" drive for sufficient clamping.

Figure 10:
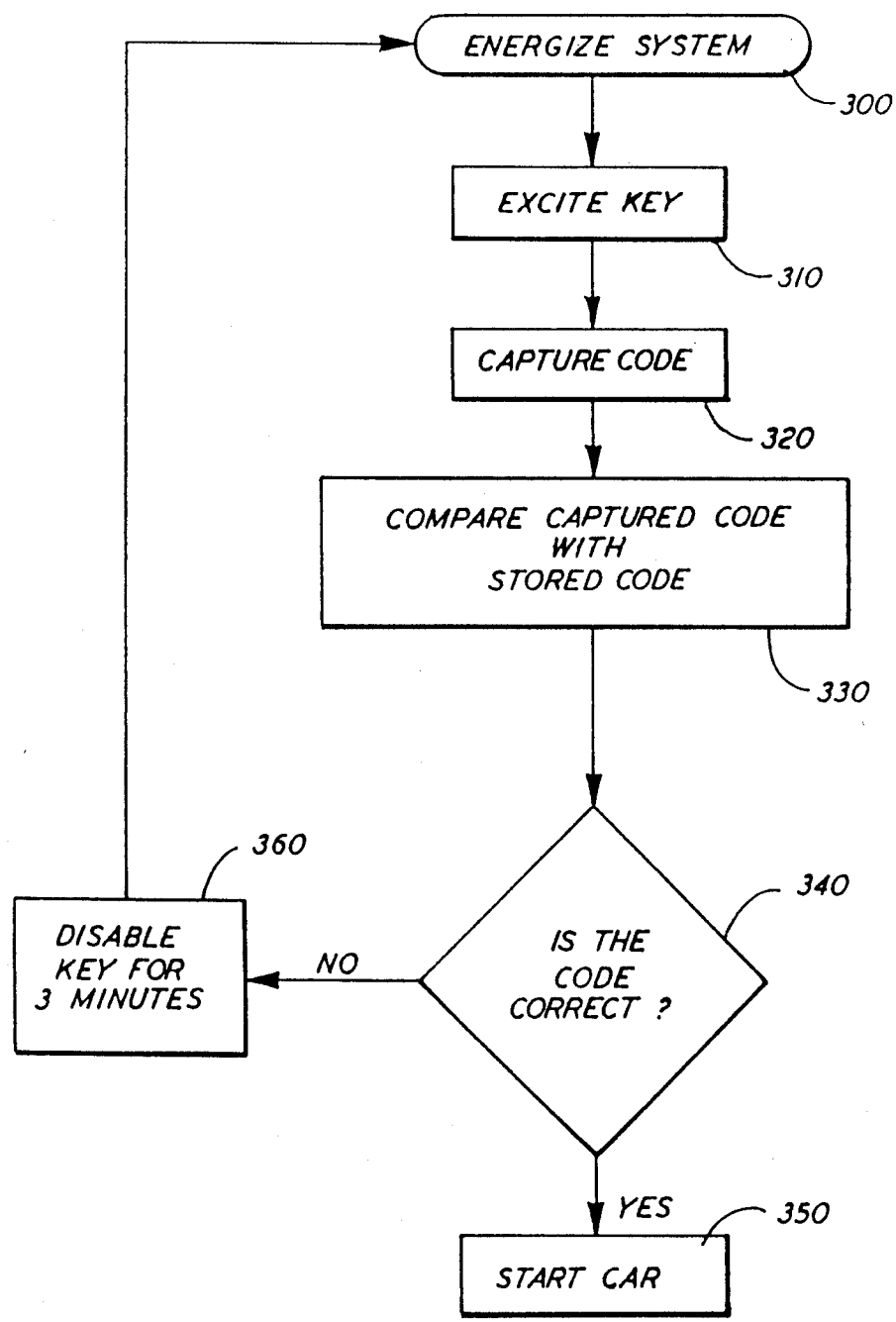
FIG. 10 is a flow chart showing operation of the invention by an operator of a motor vehicle.
Figure 11:
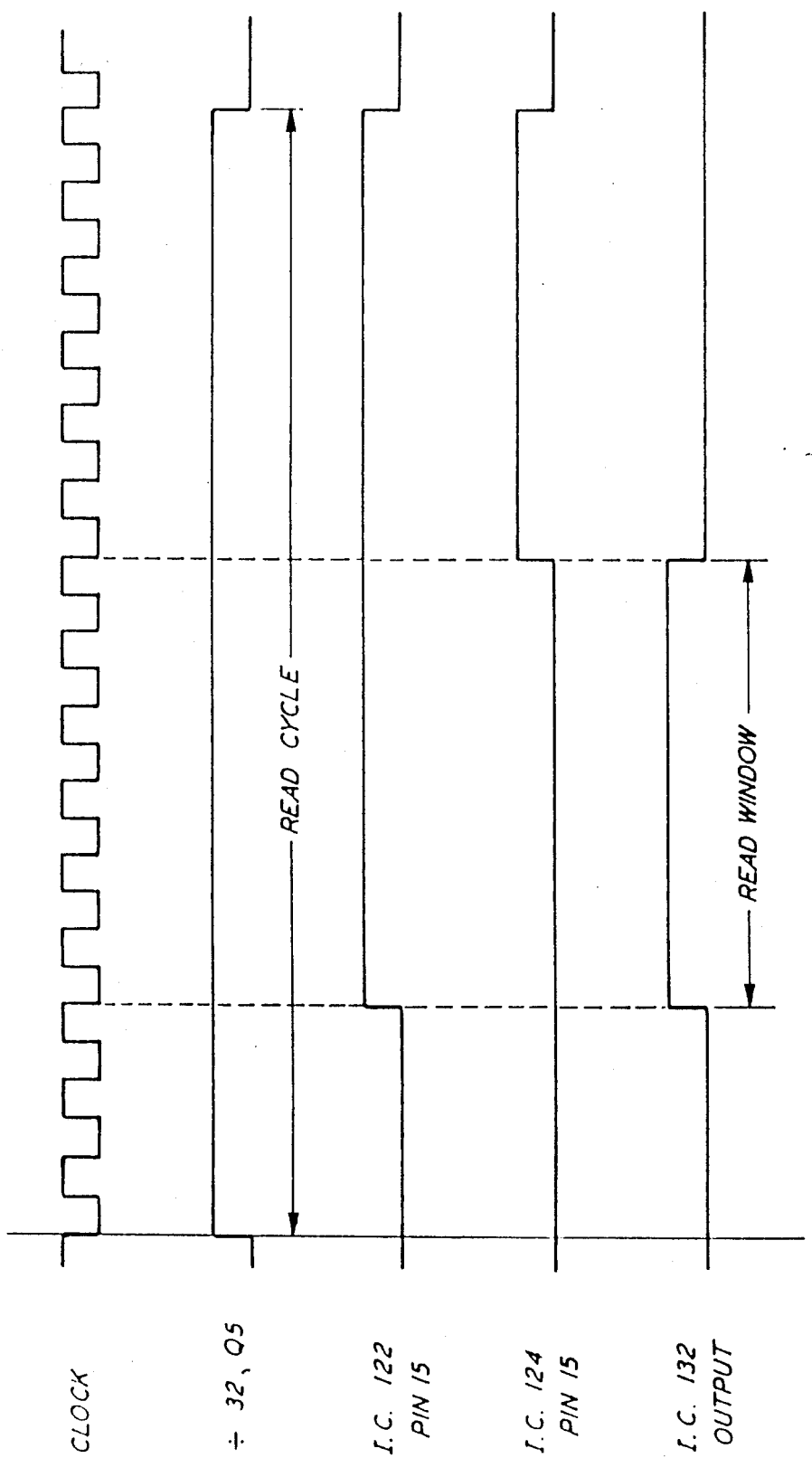
FIGS. 11 and 12 are timing diagrams representing FIG. 8 circuit operation.
Figure 12:
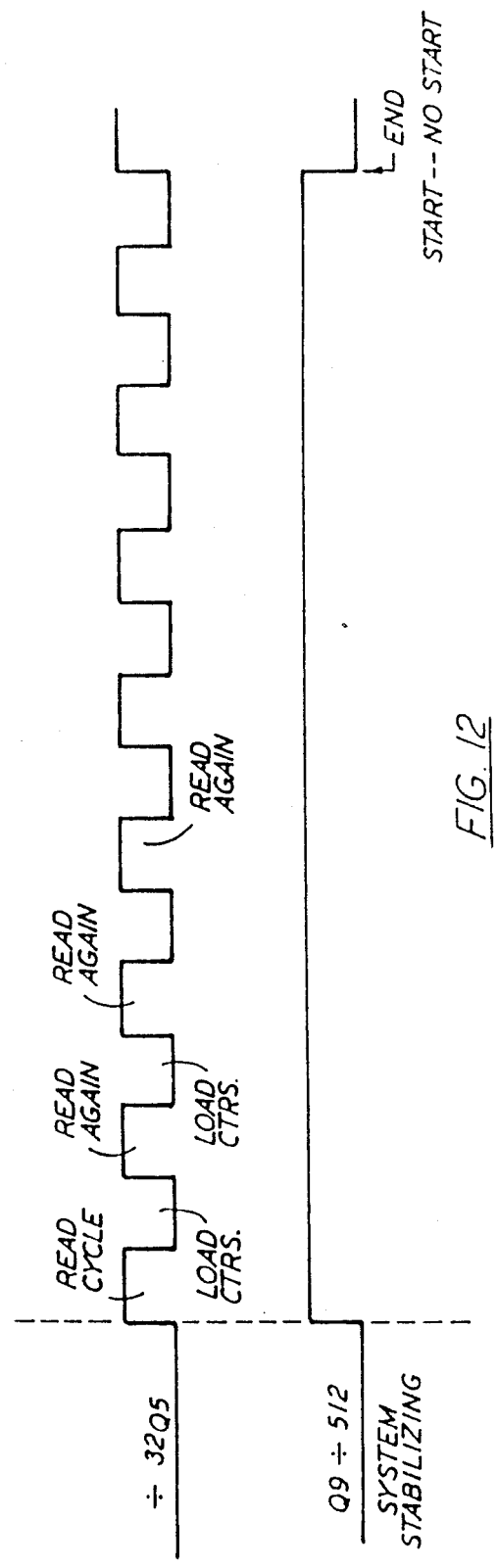

Referring now also to FIG. 10, there is shown a flow chart of system operation. It will also be helpful to refer to FIGS. 11 and 12, which depict timing diagrams of signals generated by components depicted in FIG. 8 and whose reference numerals are cited adjacent the timing lines in the FIGURES. The Q5 and Q9 signals refer to those generated by IC 120.

Initially, the system is energized, step 300, by the motor vehicle battery, not shown. The ignition key, including the SAW device imbedded therein, is excited, step 310.

The SAW device (FIG. 6) receives an electromagnetic energy pulse via its coil or antenna 36. The entire array is energized along the bus bars 62 and 64. The launch transducer 50 generates surface electroacoustic waves along the piezoelectric substrate in the direction of the transmission line 66. After a time equal to the propagation time for such waves along the blank portion of the transmission line, the electroacoustic acoustic waves are reconverted to electromagnetic energy and reradiate electromagnetic waves via the coupling coil 36. Thus, the code contained in the SAW device is captured, step 320.

Once the code is captured, it is compared with a code stored in the computer processor 16 (FIG. 1) of the motor vehicle, not shown, step 330. In another part of the processor 16, the co-ed is tested, step 340. If the code captured from the SAW device key 26 compares favorably with the code stored in the processor 16, the motor vehicle can be started and operated, step 350. If, however, the captured code and the stored code are unsuccessfully compared, the motor vehicle cannot be started, step 360.

In the preferred embodiment, a predetermined time, such as three minutes, must follow the attempted use of a key 26 having encoded therein an incorrect code. In alternate embodiments, however, the time period can be lengthened, shortened or even eliminated.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A tamper-resistant ignition device for a motor vehicle having a self-propagating acoustical wave system comprising:
   (a) a receptacle having a first coupling coil for imparting energy to a surface acoustical wave device;
   (b) an electrically isolated, non-powered self-propagating surface acoustical wave (SAW) device having a code and being operatively associated with, and deriving its power from, said receptacle and adapted for relative movement thereto, said SAW device comprising a second coupling coil for non-contact interaction with said first coupling coil for obtaining said energy therefrom and propagating an acoustical wave in response to said non-contact interaction, said acoustical wave generating a code signal that is transferred back to said second coupling coil for transmission back to said first coupling coil of said receptacle; and
   (c) testing means operatively connected to said receptacle for determining whether said SAW device code signal is valid for operation of said motor vehicle including excitation means for generating a single cycle pulse in response to said relative movement of said SAW device with respect to said receptacle and having a rate that is the same as a data rate of said SAW device, so that the code signal can be coupled with a comparison signal for comparison thereof, means for generating a read window for reading the code signal transferred to said first coupling coil of said receptacle only at proper time of transfer thereof, so that a proper comparison can be made, and a function disable means operatively connected to said means for generating said read window, that disables a reading of said code signal prior to the generation of said read window, and allows for an equilibrium condition to be reached in said testing means, and a bit counter means operatively connected to said means for generating said read window for counting bits of said code signal signifying a correct read in addition to a successful match of the code signal with said comparison signal.

2. The security system in accordance with claim 1 wherein said SAW device is connected to a mechanical ignition key, which ignition key completes said ignition system of said motor vehicle.

3. The security system in accordance with claim 1 wherein said code is a binary code.

4. The tamper-resistant ignition device of claim 1, wherein said testing means further comprising a bit counter means operatively connected to said means for generating said read window for counting bits of said code signal signifying a correct read in addition to a successful match of the code signal with said comparison signal.

5. The tamper-resistant ignition device of claim 1, wherein said bit counter means counts high bits of said code signal.

6. The tamper-resistant ignition device of claim 4, wherein said bit counter means counts high bits of said code signal.

7. The tamper-resistant ignition device of claim 1, wherein said testing means further comprises a register, and further wherein said means for generating a read window is operatively connected to said first coupling coil and said register means for assuring that data from said code signal is transferred to said register only when said code signal is being transferred from said SAW device.

8. The tamper-resistant ignition device of claim 7, wherein said register comprises a shift register that receives code signal data in a serial fashion and applies same as a block of data for comparison purposes.

9. A tamper-resistant ignition device for a motor vehicle having a self-propagating acoustical wave system comprising:
(a) a receptacle having a first coupling coil for imparting energy to a surface acoustical wave device;
(b) an electrically isolated, non-powered, self-propagating surface acoustical wave (SAW) device having a code and being operatively associated with, and deriving its power from, said receptacle and adapted for relative movement thereto, said SAW device comprising a second coupling coil for non-contact interaction with said first coupling coil for obtaining said energy therefrom and propagating an acoustical wave in response to said non-contact interaction, said acoustical wave generating a code signal that is transferred back to said second coupling coil for transmission back to said first coupling coil of said receptacle; and
(c) testing means operatively connected to said receptacle for determining whether said SAW device code signal is valid for operation of said motor vehicle including excitation means for generating a single cycle pulse in response to said relative movement of said SAW device with respect to said receptacle and having a rate that is the same as a data rate of said SAW device, so that the code signal can be coupled with a comparison signal for comparison thereof, means for generating a read window for reading said signal code at a specific period, comparison means for coupling and comparing said code signal with said comparison signal a plurality of times after said code signal has been read during a read window period of said testing means in order to insure a successful match, and a function disable means operatively connected to said means for generating said read window, that disables a reading of said code signal prior to the generation of said read window, and allows for an equilibrium condition to be reached in said testing means, and a bit counter means operatively connected to said means for generating said read window for counting bits of said code signal signifying a correct read in addition to a successful match of the code signal with said comparison signal.

10. The tamper-resistant ignition device of claim 9, wherein said testing means further comprising a bit counter means operatively connected to said means for generating said read window for counting bits of said code signal signifying a correct read in addition to a successful match of the code signal with said comparison signal.

11. The tamper-resistant ignition device of claim 10, wherein said bit counter means counts high bits of said code signal.